US009887016B2

(12) United States Patent
Nopwaskey et al.

(10) Patent No.: US 9,887,016 B2
(45) Date of Patent: Feb. 6, 2018

(54) BWR FEEDWATER SPARGER END BRACKET PIN CLAMP

(71) Applicant: AREVA Inc., Lynchburg, VA (US)

(72) Inventors: Fred C. Nopwaskey, San Jose, CA (US); Joel J. Letourmy, San Jose, CA (US); Randy M. Villeneuve, Amherst, VA (US); Ryan M. Welsh, Lynchburg, VA (US); Stephan M. Hunter, Evington, VA (US)

(73) Assignee: AREVA Inc., Lynchburg, VA (US)

( * ) Notice: Subject to any disclaimer, the term of this patent is extended or adjusted under 35 U.S.C. 154(b) by 848 days.

(21) Appl. No.: 14/247,161

(22) Filed: Apr. 7, 2014

(65) Prior Publication Data

US 2015/0287482 A1 Oct. 8, 2015

(51) Int. Cl.
| | |
|---|---|
| *G21C 15/02* | (2006.01) |
| *G21C 13/032* | (2006.01) |
| *G21C 15/22* | (2006.01) |
| *G21C 17/017* | (2006.01) |
| *G21C 19/20* | (2006.01) |

(52) U.S. Cl.
CPC .......... *G21C 15/02* (2013.01); *G21C 13/032* (2013.01); *G21C 15/22* (2013.01); *G21C 17/017* (2013.01); *G21C 19/207* (2013.01); *Y02E 30/31* (2013.01)

(58) Field of Classification Search
CPC ..... G21C 1/08; G21C 1/084; G21C 2001/088
See application file for complete search history.

(56) References Cited

U.S. PATENT DOCUMENTS

| 4,834,935 A | 5/1989 | Daigle et al. |
| 4,859,403 A | 8/1989 | Dixon et al. |
| 6,375,130 B1 | 4/2002 | Jensen et al. |
| 6,456,682 B1 | 9/2002 | Jensen |
| 7,492,851 B2 | 2/2009 | Butler et al. |

(Continued)

FOREIGN PATENT DOCUMENTS

| CN | 202623508 | 12/2012 |
| EP | 1241680 A1 | 9/2002 |
| EP | 2128504 A1 | 12/2009 |

OTHER PUBLICATIONS

International Search Report from corresponding PCT Application No. PCT/US2015/024500, dated Jun. 19, 2015.

(Continued)

*Primary Examiner* — Marshall P O'Connor
(74) *Attorney, Agent, or Firm* — Davidson, Davidson & Kappel, LLC (57) ABSTRACT

A clamp for a boiling water reactor feedwater sparger is disclosed and claimed. The clamp assembly includes abuse and cooperating bolt, a reaction arm, and a cross pin. With the exception of the cross pin, the parts are pre-assembled and then installed over the sparger pin head. The cross pin is then installed through the clamp base and through the sparger pin. The clamp bolt is then tightened, locking the clamp and sparger pin. The clamp provides an increased surface area that extends 360° around the sparger pin. This increased surface area reduces the likelihood of wear of the clamp or bracket during plant operation, and the clamp restores the position of the sparger pin head relative to the contact surface of the end bracket if the original pin head or bracket is worn.

13 Claims, 5 Drawing Sheets

(56) References Cited

U.S. PATENT DOCUMENTS

| | | |
|---|---|---|
| 7,505,546 B2 | 3/2009 | Butler et al. |
| 8,194,815 B2 | 6/2012 | Wroblewski et al. |
| 2002/0122524 A1 | 9/2002 | Ohno et al. |
| 2006/0082139 A1 | 4/2006 | Jensen |
| 2008/0112530 A1 | 5/2008 | Jensen et al. |
| 2009/0294229 A1* | 12/2009 | Matsumoto ............ F16L 55/035 188/266 |
| 2010/0246744 A1 | 9/2010 | Wroblewski et al. |
| 2011/0235770 A1 | 9/2011 | Jensen |

OTHER PUBLICATIONS

Written Opinion from corresponding PCT Application No. PCT/US2015/024500, dated Jun. 19, 2015.

* cited by examiner

BWR FEEDWATER SPARGER END BRACKET PIN CLAMP

BACKGROUND OF THE INVENTION

1. Field of the Invention

The present invention relates to feedwater spargers in boiling water reactors and, more particularly, to clamps for the end bracket assemblies of feedwater spargers.

2. Description of the Related Art

While the present invention may be used in a variety of industries, the environment of a boiling water reactor (BWR) nuclear power plant will be discussed herein for illustrative purposes. In a BWR, a steam-water mixture is produced when reactor coolant (water) moves upward through the core, absorbing heat produced by the fuel. The steam-water mixture leaves the top of the core and enters a moisture separator, where water droplets are removed before the steam is allowed to enter the steam line. The steam line directs the steam to the main turbine, causing it to turn the turbine and the attached electrical generator. The steam is then exhausted to a condenser where it is condensed into water. The resulting water is pumped out of the condenser back to the reactor vessel as feedwater. Recirculation pumps and jet pumps allow the operator to vary coolant flow through the core and change reactor power.

Within the BWR vessel, core shrouds surround the core to provide a barrier to separate the downward coolant flow through the annulus/downcomer (the space between the core shroud and the reactor vessel wall) from the upward flow through the core and fuel bundles. The feedwater is injected through nozzles in the reactor vessel and distributed by feedwater spargers. The feedwater spargers are located inside the reactor vessel and include a central T-connection with two pipe branches that are curved concentric with the inside radius of the reactor vessel. Each curved pipe has a set of nozzles through which the feedwater is injected.

Figure 7:
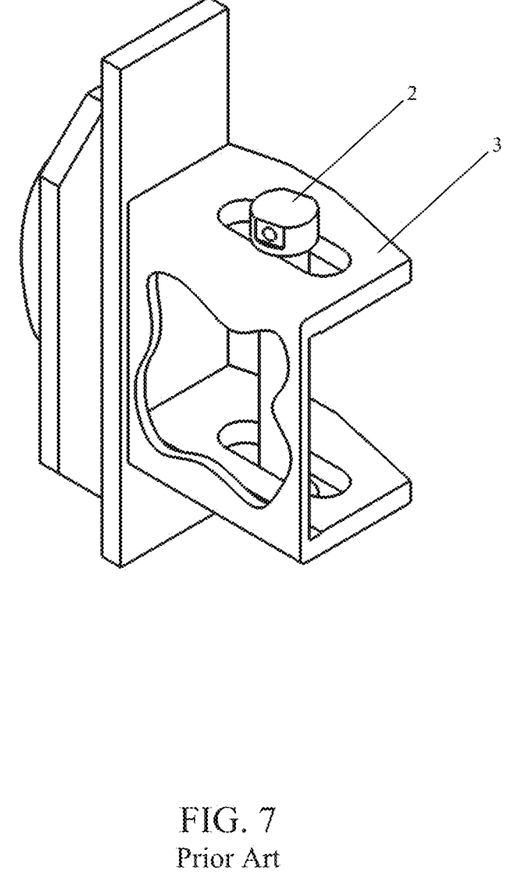
FIG. 7 shows a partially cut-away isometric view of a typical sparger end bracket and pin assembly.

Each curved pipe has an end bracket that is welded to the pipe. The end brackets are C-shaped and surround an attachment lug that is welded to the reactor vessel wall. Pins having relatively large diameter heads are inserted through the end brackets and the attachment lug. Each pin has a securing nut on the bottom that is installed tightly against a shoulder of the pin but allows a gap between the nut and the bottom of the end bracket while the head of the pin rests against the top of the bracket. The sparger end brackets are secured axially to the attachment lug, but the end brackets are slotted to allow for relative thermal expansion and contraction of the feedwater sparger assembly. FIG. 7 shows a partially cut-away isometric view of a typical sparger end bracket assembly, including the pin 2 and bracket 3.

Visual inspection of the spargers has revealed wearing of the end brackets and pin heads. The wear is caused by vibration of the pin relative to the bracket, which is believed to be caused by flow induced vibration.

SUMMARY OF THE INVENTION

The present invention provides a solution to the wear problems discussed above, and includes several components that collectively act as a clamp that is installed on the feedwater sparger end bracket pin to increase the bearing area of the pin head without removing the feedwater sparger pin. The increased surface area of the clamp spreads the weight of the sparger pin over a larger area of the bracket, thereby reducing the load per unit area of the pin head relative to the surface of the bracket. The larger contact area will reduce future bracket and/or pin wear. In addition, the device also restores the position of the sparger pin head relative to the contact surface of the end bracket if the original pin head or bracket is worn.

The clamp assembly includes abuse and cooperating bolt, a reaction arm, and a cross pin. With the exception of the cross pin, the parts are pre-assembled and then installed over the sparger pin head after lifting the pin head above the surface of the sparger bracket. The cross pin is then installed through the clamp base and through the (pre-existing) hole in the sparger pin head. The clamp bolt is then tightened, forcing the reaction arm against the top surface of the sparger pin head. This captures the dowel pin (which locks the reaction arm to the clamp bolt) within the clamp base and pushes the sparger pin head against the cross pin, forcing the cross pin against the contact surfaces on the clamp base. A predefined torque is then applied to the bolt to secure the clamp to the sparger pin head. Tightening the clamp bolt lowers the reaction arm, causing the distal end of the reaction arm to capture the cross pin and lock it with the clamp base. To prevent movement of the bolt during plant operation, the crimp cup is deformed into features in the bolt shank. The clamp can be removed from the sparger pin by de-torqueing the bolt. To accommodate the de-torqueing process, the crimp cup is secured to the clamp base with the lock pin to prevent movement of the cup. Re-installation of the clamp is possible after replacing the crimp cup.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

Figure 1:
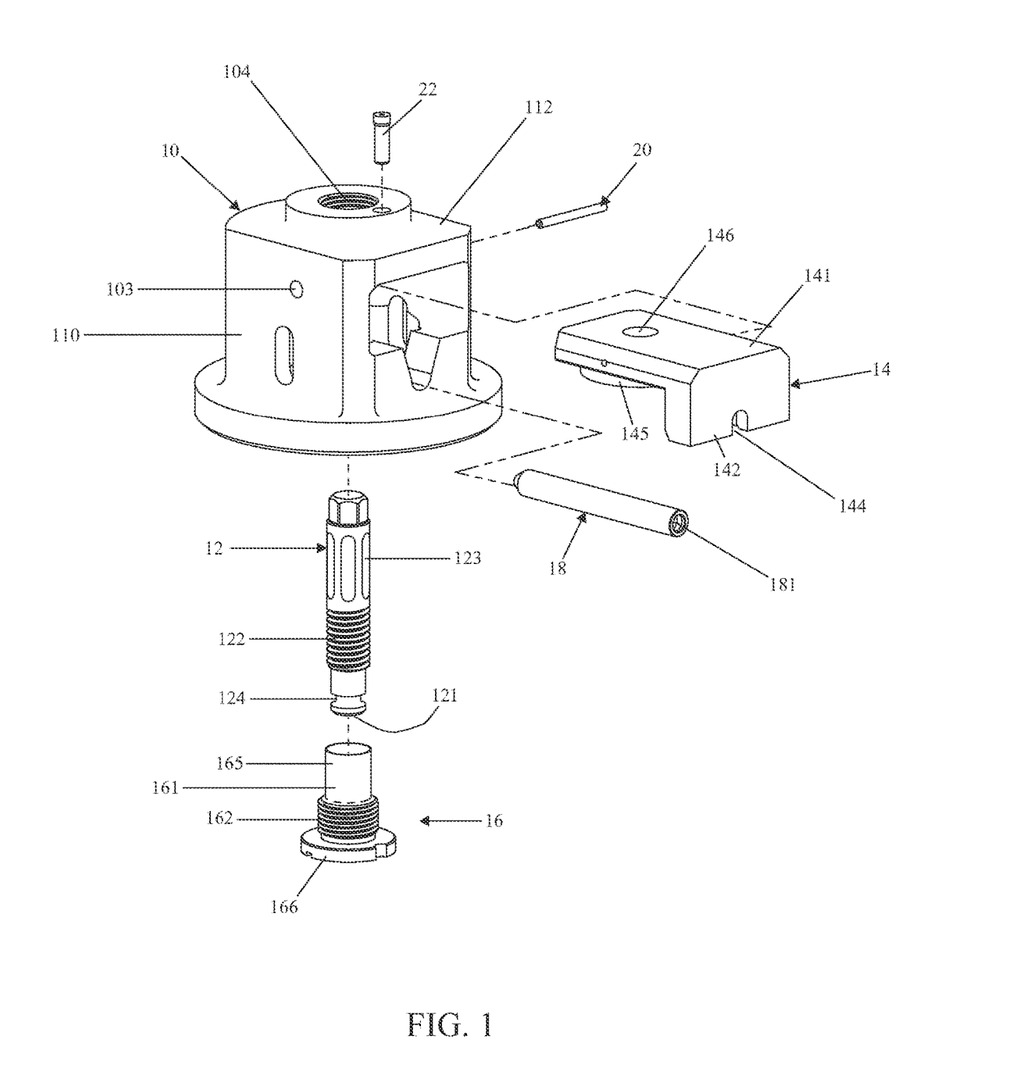
FIG. 1 shows an exploded perspective view of the components of a clamp assembly of the present invention.
Figure 2:
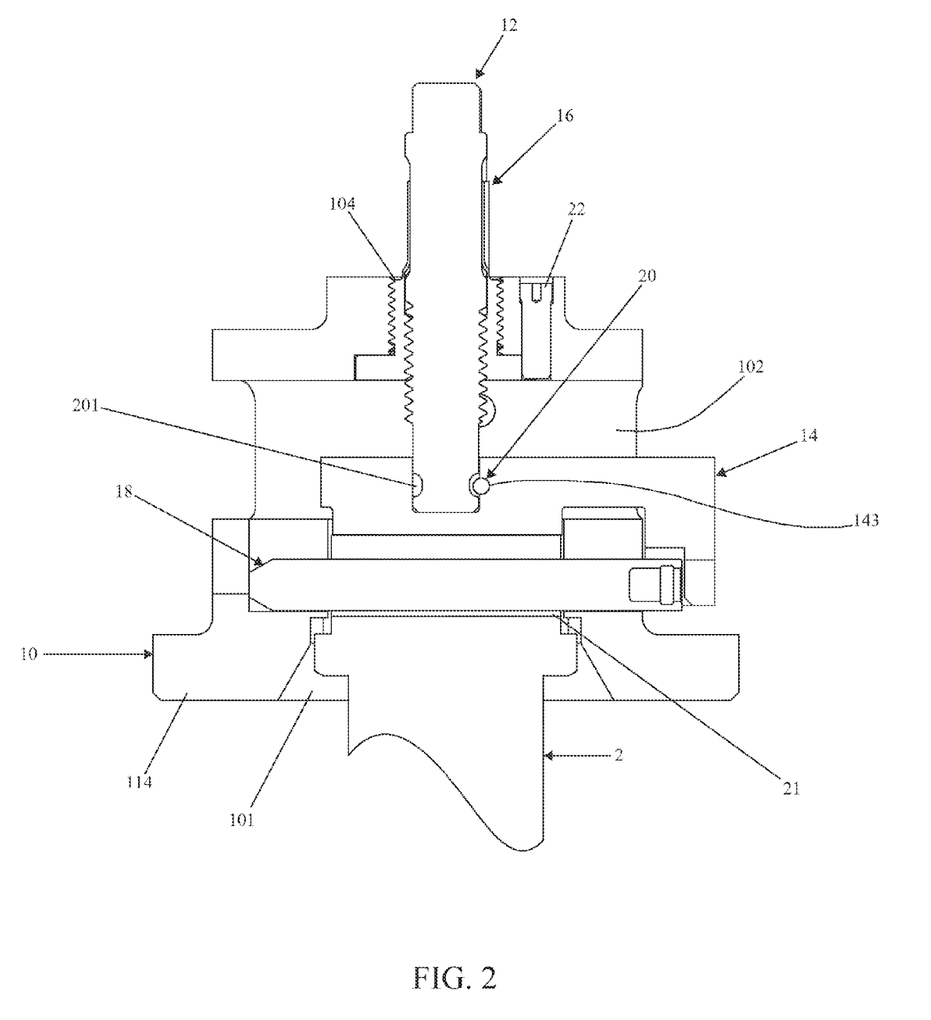
FIG. 2 shows a cross-sectional view of the clamp assembly of FIG. 1 in place on the head of a sparger bracket pin.

FIG. 1 shows an exploded perspective view of the components of a clamp assembly 1 of the present invention, and FIG. 2 shows a cross-sectional view of the clamp assembly 1 in a use position on the head of a sparger bracket pin 2. The clamp 1 includes a base 10 with a body that defines a chamber 101 configured to fit over and around the head of the sparger pin 2. In a preferred embodiment, the base 10 includes one or more side walls 110 and a top wall 112. While the embodiment of the base 10 illustrated in FIGS. 1 and 2 has an angular shape with multiple side walls 110, the base 10 may have alternate profiles such as a round or circular shape in which it may have only a single side wall 110. In any event, the base 10 has a body defining a chamber 101, which may be chamfered or beveled to facilitate positioning the base 10 over the sparger pin 2.

Figure 3:
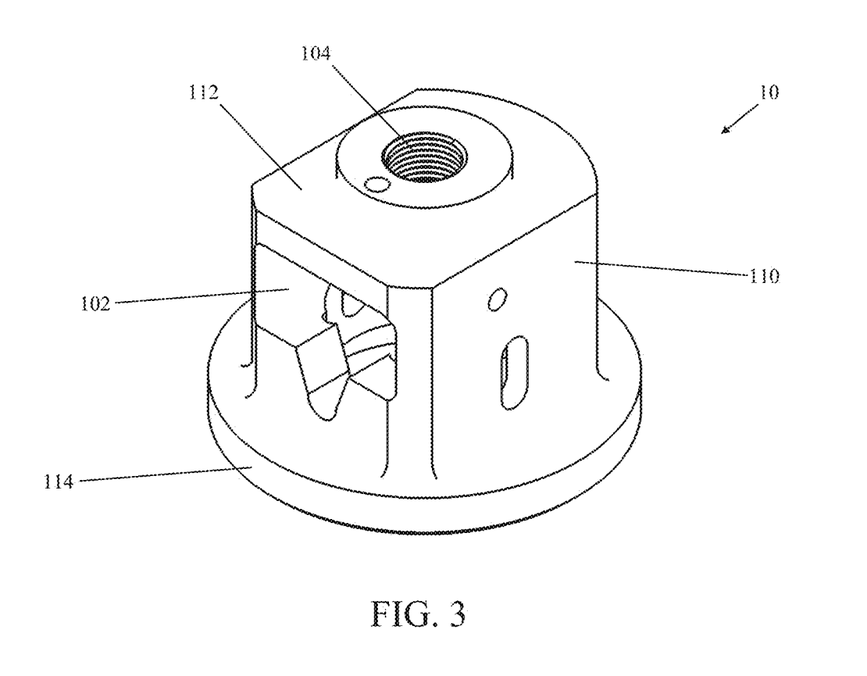
FIG. 3 shows an isometric view of the base of the clamp assembly of FIG. 1.

The body of the base 10 defines a plurality of holes therethrough. The base body 10 defines a hole 102 passing through the side wall 110. Preferably, a corresponding hole 102 passes through the opposite side wall 110 to define a path completely through the base 10. The base 10 further defines a hole 104 passing through the top wall 112. This top hole 104 is threaded to engage corresponding threads on the bolt 12.

Figure 5:
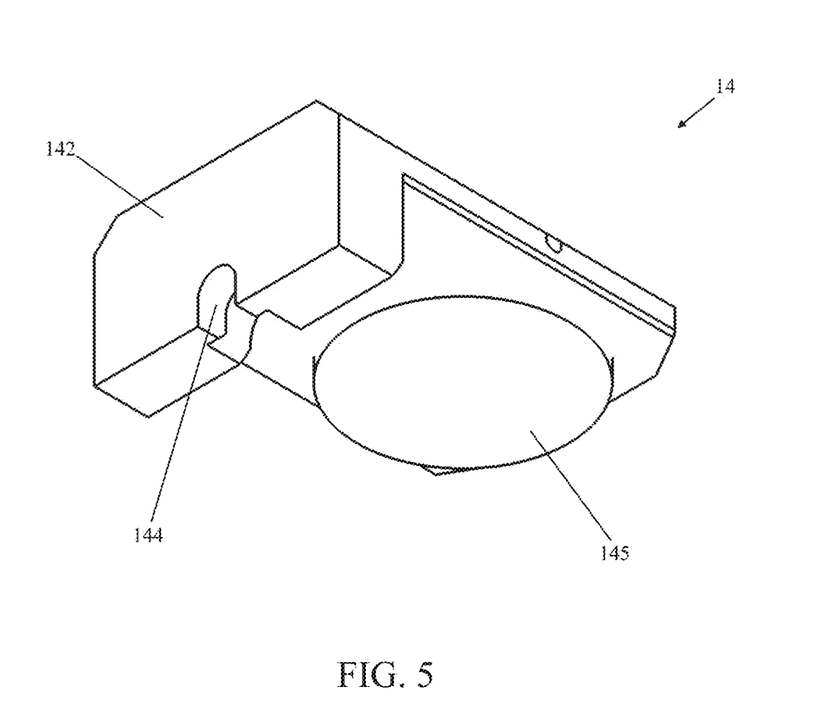
FIG. 5 shows an isometric view of the reaction arm of the clamp assembly of FIG. 1.

The clamp assembly 1 further includes a reaction arm 14 that is configured to engage with the base 10 through the side wall opening 102. In a preferred embodiment, the reaction arm 14 has an L-shape defining substantially perpendicular arms 141 and 142. The reaction arm is configured to pass over a ledge of the base side wall 110 formed by the side hole 102 such that proximal arm 142 extends downward adjacent the base side wall 110. As seen in FIG. 2, the reaction arm 14 is thus cantilevered relative the base 10.

The reaction arm 14 extends through a majority of the thickness of the base 10 such that the reaction arm 14 overlies the sparger pin 2. The reaction arm 14 has a first surface 145 configured to engage the top surface of the sparger pin head. In a preferred embodiment, this may include an engagement portion that extends away from body 141 of the reaction arm 14. The reaction arm 14 further comprises a second surface 146 configured to engage the clamp bolt 12 as is discussed in more detail below.

Figure 4:
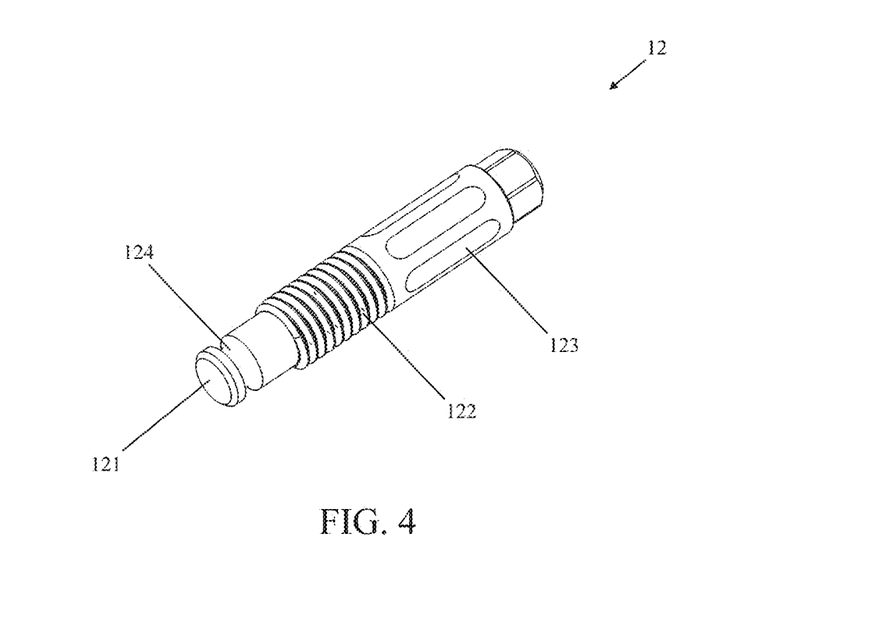
FIG. 4 shows an isometric view of the bolt of the clamp assembly of FIG. 1.

The clamp assembly further includes a bolt 12 that is configured to matingly engage the threaded opening 104 through the base top wall 112. An abutment surface 121 is provided at the lower end of the bolt 12. By engaging the threaded region 122 of the bolt 12 with corresponding threads in the upper base opening 104, the bolt abutment surface 121 can be lowered into contact with the reaction arm upper surface 146. A force can thus be applied to the reaction arm 14, which is transferred through the reaction arm lower surface 145 to the sparger pin 2. This locks the clamp assembly 1 to the cross pin 18, as is discussed further below. The reaction arm upper surface 146 may contain an indentation or depression therein configured to engage the bolt abutment surface 121.

The clamp assembly 1 further includes a cross pin 18 that is configured to extend through the base 10 and a hole 21 provided in the head of the sparger pin 2. Preferably, as shown in the illustrated embodiment of FIG. 1, the base side opening 102 contains V-channels in the lower ledges of the side wall 110 in which ends of the cross pin 18 rest. The V-channel on the side opposite the reaction arm 14 does not extend completely through the base side wall 110, however, so that the opposite end of the cross pin 18 contacts an internal surface of the base side wall 110 to lock the cross pin 18 within the base 10 and prevent it from becoming dislodged from the clamp assembly 1. The cross pin 18 may include a ridged recess 181 in an end thereof to facilitate insertion and, if desired, removal of the cross pin 18 from the clamp assembly 1.

With the cross pin 18 positioned within the base 10 and sparger pin 2, the bolt is torqued to lower its abutment surface 121 into contact with the reaction arm upper surface 146. Continued torqueing of the bolt 12 causes the reaction arm 14 to lower, causing the reaction arm lower surface 145 to lower and exert a force against the top surface of the sparger pin 2. The sparger pin 2 and cross pin 18 are thus forced downward. When the bolt 12 is tightened to a predetermined torque, the clamp assembly 1 is fixedly locked to the sparger pin 2. A lower flange 114 of the base 10 is thus positioned to engage an upper surface of the sparger end bracket with an increased surface area with respect to the original contact surface area provided by the head of the sparger pin 2. Additionally, the clamp assembly 1, and the flange 114 in particular, provides 360° contact around the sparger pin 2. This provides assurance of contact regardless of whether discrete areas of the end bracket top surface have been worn or eroded through operation of the reactor prior to installation of the inventive clamp assembly 1.

Figure 6:
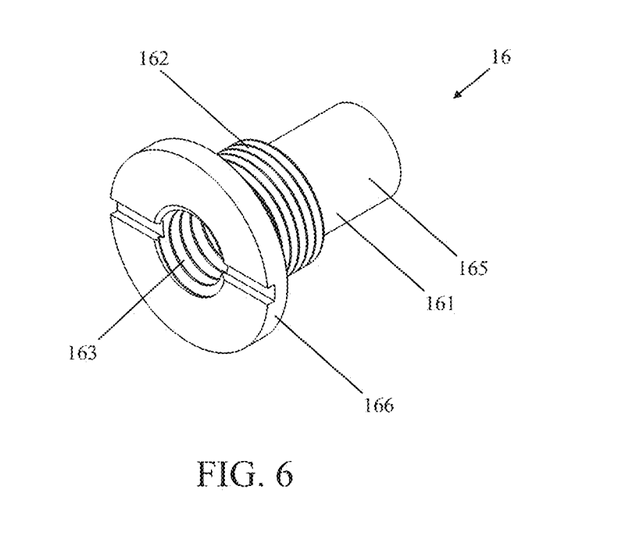
FIG. 6 shows an isometric view of the crimp cup of the clamp assembly of FIG. 1.

A crimp cup 16 may be included with the clamp assembly 1. The crimp cup 16 is configured to be positioned intermediate the base 10 and the bolt 12. A cylindrical portion 161 contains external threads 162 that matingly engage the threaded upper base opening 104 and internal threads 163 that matingly engage the bolt threads 122. A non-threaded region 165 of the cylindrical portion 161 extends beyond threaded region 162.

The crimp cup 16 is inserted into the base upper opening 104 from the lower side thereof; that is, through the base internal chamber 101. The external threads 162 are matingly engaged with the base upper opening 104 until a flange 166 on the lower portion of the crimp cup 16 comes into contact with an internal surface of the base upper wall 112. The bolt is then coupled to the internal threads 163 of the crimp cup 16.

As shown in FIG. 2, the non-threaded region 165 of the crimp cup 16 will extend beyond the base upper wall 112 when the flange 166 abuts the base 10. The crimp cup 16 is formed of a malleable material, such as stainless steel. Once the bolt 12 is torqued to the prescribed force and the clamp assembly 1 is locked to the sparger pin 2, the non-threaded region 165 of the crimp cup 16 can be plastically deformed into channels 123 formed on the shaft of the bolt 12. This crimping locks the bolt 12 in place, preventing it from backing out and becoming dislodged from the clamp assembly 1.

Preferably, the thermal 163 and external 162 threads of the crimp cup have opposite thread configurations. For example, the external threads 162 may be left-handed and the internal threads 163 may be right-handed. This help ensure the crimp cup 16 remains in place during engagement of the bolt 12 as rotation of the bolt 12 into the crimp cup 16 will work to tighten the coupling of the crimp cup 16 to the base 10.

The clamp assembly 1 can be removed from the sparger pin 2 by exerting a torque of enough magnitude, such as 20-25 foot-pounds, to release the crimped portion 165 of the crimp cup 16 from the bolt channels 123. The bolt 12 can then be backed out of the clamp assembly 1, relieving the force exerted against the cross pin 18 and freeing it for removal from the assembly 1. The clamp assembly 1 can be re-used with the replacement of the crimp cup 16.

A dowel pin 20 may be provided with the clamp assembly 1. The dowel pin 20 is inserted through a hole 103 in the base 10 into a groove 201 cooperatively formed by a groove 124 formed in the bolt 12 and a groove 143 formed in a distal end of the reaction arm 14. The hole 103 is located such that the bolt groove 124 is aligned with the hole 103 when the bolt 12 is partially inserted into the base 10. Further tightening of the bolt 12—with the dowel pin 20 within the groove 201—lowers the dowel pin 20 below the hole 103. The dowel pin 20 is thus captured within the base 10 such that it cannot become dislodged or separated from the clamp assembly 1. The hole 103 can also be deformed such as by striking its edge with a tool to provide further assurance that the dowel pin 20 does not become dislodged.

With the dowel pin 20 in place within the groove 201, the reaction arm 14 is locked to the bolt 12. This prevents the reaction arm 14 from becoming dislodged from the clamp assembly 1 prior to full torqueing of the bolt 12 to clamp the assembly 1 to the sparger pin 2. Thus, the reaction arm 14 is fixed to the clamp assembly 1 during installation of the clamp 1 into the reactor prior to insertion of the cross pin 18.

A lock pin 22 may be provided with the clamp assembly 1. The lock pin 22 is inserted into a hole provided in the base top wall 112 and into an upper surface of the crimp cup flange 166. The lock pin 22 prevents rotation and decoupling of the crimp cup 16 from the base 10 if the bolt 12 is detorqued (that is, rotated in a direction to remove it from the base 10). The hole into which the lock pin 22 is inserted may be deformed such as by striking its edge with a tool to prevent it from becoming dislodged from the clamp assembly 1. The lock pin 22 may include a ridged recess in an end thereof to facilitate insertion and, if desired, removal of the lock pin 22 from the clamp assembly 1.

In use, the clamp 1 is partially pre-assembled prior to its installation into the reactor. First, the crimp cup 16 is coupled into the base 10 by threading it into the top wall hole 104 such that the flange 166 abuts a lower surface of the base upper wall 112. The bolt 12 is then coupled to the crimp cup 16 by threading it into the crimp cup internal threads 163. The bolt 12 is inserted to the point when its groove 124 is aligned with the base dowel pin hole 103. The reaction arm 14 is then inserted into the base side opening 102 such that its groove 143 is adjacent the bolt groove 124, thereby forming the dowel pin groove 201. The dowel pin 20 is then inserted through the base hole 103 into the groove 201. This insertion may be performed in known manner, such as via a plunger or air cylinder. The bolt 12 is then threaded further into the base 10, capturing the dowel pin 20 within the base 10 and locking the reaction arm 14 to the bolt 12. The bolt 12 is inserted far enough to capture the dowel pin 20, but to still leave clearance between the reaction arm 14 and the V-channel of the lower edge of the base side opening 102. The base 110, bolt 12, reaction arm 114, crimp cup 16, and dowel pin 20 are now fixed together as a subassembly or unit.

The preassembly is then loaded into a specially designed tool for insertion into the reactor. Additional openings in the base 10 may be provided to facilitate gripping of the subassembly by the tool. The tool also holds the cross pin 18, such as by the positioning of a detent within the recess 181. The tool and clamp assembly components are then lowered into the reactor to the location of the sparger pin 2 of interest. Arms of the tool are engaged to lift the sparger pin bolt, creating clearance between the sparger pin head and the sparger bracket. With the subassembly positioned atop the sparger pin head, the cross pin 18 is inserted through the base side opening 102 and sparger pin 2. An air cylinder or plunger of the tool may be used to insert the cross pin 18.

With the cross pin 18 in place, the bolt 12 is torqued to lock the clamp assembly 1 to the sparger pin 2. This is accomplished by the tooling, which torques the bolt 12 to approximately 20 foot-pounds. Torqueing the bolt 12 also lowers the reaction arm such that its proximal arm 142 covers the cross pin 18, capturing it within the clamp assembly 1. A notch 144 in a lower surface of the proximal arm 142 allows the tooling to be engaged with the cross pin 18 while the bolt 12 is being torqued. However, the notch 144 is smaller than the cross pin 18 and will not allow it to pass therethrough. Finally, the upper portion 165 of the crimp cup 16 is crimped, locking the bolt 12 in place. The clamp assembly is thus fixedly locked to the sparger pin 2, and the tooling is removed from the reactor.

Sparger pins 2 are typically formed of 304 stainless steel. The materials of the clamp assembly 1 components are chosen such that thermal expansion caused by engagement and operation of the reactor will cause the clamp 1 to tighten on the sparger pin 2 rather than becoming loose. Thus, the clamp assembly material has a lesser coefficient of thermal expansion than the sparger pin 2. One preferred material for the clamp assembly 1 is XM19 stainless steel.

While directional references such as top, bottom, upper, and lower have been referenced herein, they are used for explanatory purposes relative the illustrated embodiments shown in the drawing figures only and should not be construed as limiting.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A clamp for a boiling water reactor sparger end assembly, the boiling water reactor sparger end assembly including a bracket and a sparger pin configured to pass through the bracket, the sparger pin including a head with a hole therethrough, the clamp comprising:
    a base defining a chamber configured to fit over and around the sparger pin head, said base including a top wall having a first hole therethrough and a side wall having a second hole therethrough;
    a bolt configured to fit through said first hole, said bolt including a bolt abutment surface;
    a reaction arm configured to fit through said second hole and having a first surface configured to engage a top surface of the sparger pin and a second surface opposite said first surface and configured to engage said bolt abutment surface; and
    a cross pin configured to fit through said second hole and the sparger pin head hole;
    wherein rotation of said bolt is configured to impart a force through said reaction arm to the sparger pin and said cross pin to join said base and the sparger pin.

2. The clamp of claim 1, wherein said base includes a flange configured to surround the sparger pin head, said flange defining a flange abutment surface configured to engage the bracket.

3. The clamp of claim 2, wherein said flange abutment surface has a greater surface area than a sparger pin head abutment surface defined by the sparger pin head.

4. The clamp of claim 1, wherein said reaction arm second surface contains an indentation therein, said indentation configured to engage said bolt abutment surface.

5. The clamp of claim 1, further comprising a crimp cup positioned between said base and said bolt.

6. The clamp of claim 5, wherein said crimp cup includes a hollow cylindrical portion having internal and external threads, the bolt including bolt threads, the base first hole including first hole threads, said internal threads configured to matingly engage the bolt threads and said external threads configured to matingly engage the first hole threads.

7. The clamp of claim 6, wherein said internal and external threads have opposite thread configurations.

8. The clamp of claim 5, wherein said crimp cup includes an extension portion configured to fit around a non-threaded shaft portion of said bolt.

9. The clamp of claim 8, wherein said bolt includes one or more depressions on said non-threaded portion configured to underlie said crimp cup extension portion such that said crimp cup extension portion can be plastically deformed into said one or more depressions.

10. The clamp of claim 1, further comprising a dowel pin configured to fit with a groove formed in said bolt and said reaction arm to thereby lock said reaction arm to said bolt.

11. The clamp of claim 10, wherein said groove is formed by cooperating ridges formed in said bolt and said reaction arm.

12. The clamp of claim 10, wherein said dowel pin is captured within said base in an operation configuration of said clamp.

13. The clamp of claim 1, wherein said clamp is formed of a first material having a first coefficient of thermal expansion and the sparger pin is formed of a second material having a second coefficient of thermal expansion, said first coefficient of thermal expansion being less than said second coefficient of thermal expansion.

* * * * *